United States Patent

Suzuki et al.

[11] 3,895,279
[45] July 15, 1975

[54] NUMERICALLY CONTROLLED MACHINE TOOL

[75] Inventors: Isao Suzuki, Okazaki; Hiroshi Okada, Chiryu, both of Japan

[73] Assignee: Toyoda Machine Works, Limited, Japan

[22] Filed: Nov. 8, 1973

[21] Appl. No.: 413,989

[30] Foreign Application Priority Data
Nov. 17, 1972 Japan............................. 47-115930

[52] U.S. Cl. ................. 318/571; 318/572; 318/590
[51] Int. Cl. ........................................... G05b 19/24
[58] Field of Search..................... 318/590, 571, 572

[56] References Cited
UNITED STATES PATENTS

| | | | |
|---|---|---|---|
| 3,448,362 | 6/1969 | Dorf................... | 318/571 X |
| 3,665,172 | 5/1972 | Spaargaren et al................. | 318/590 |
| 3,766,460 | 10/1973 | Hentz................................. | 318/571 |
| 3,792,333 | 2/1974 | Cutler.................................. | 318/571 |

Primary Examiner—B. Dobeck
Attorney, Agent, or Firm—Kenyon & Kenyon

[57] ABSTRACT

A numerically controlled machine tool is disclosed which includes a numerical control system having a numerical controller and a sub controller provided with a setting means for setting the partial variation to a series of feeding motions of a movable member of the machine tool. When part of the series of feeding motions of the movable member of the machine tool is required to be varied by a special function command issued by the numerical controller, the sub controller drives and controls the part of the series of feeding motions of the movable member by cooperation with the numerical controller, on the basis of the partial variation set by the setting means.

5 Claims, 9 Drawing Figures

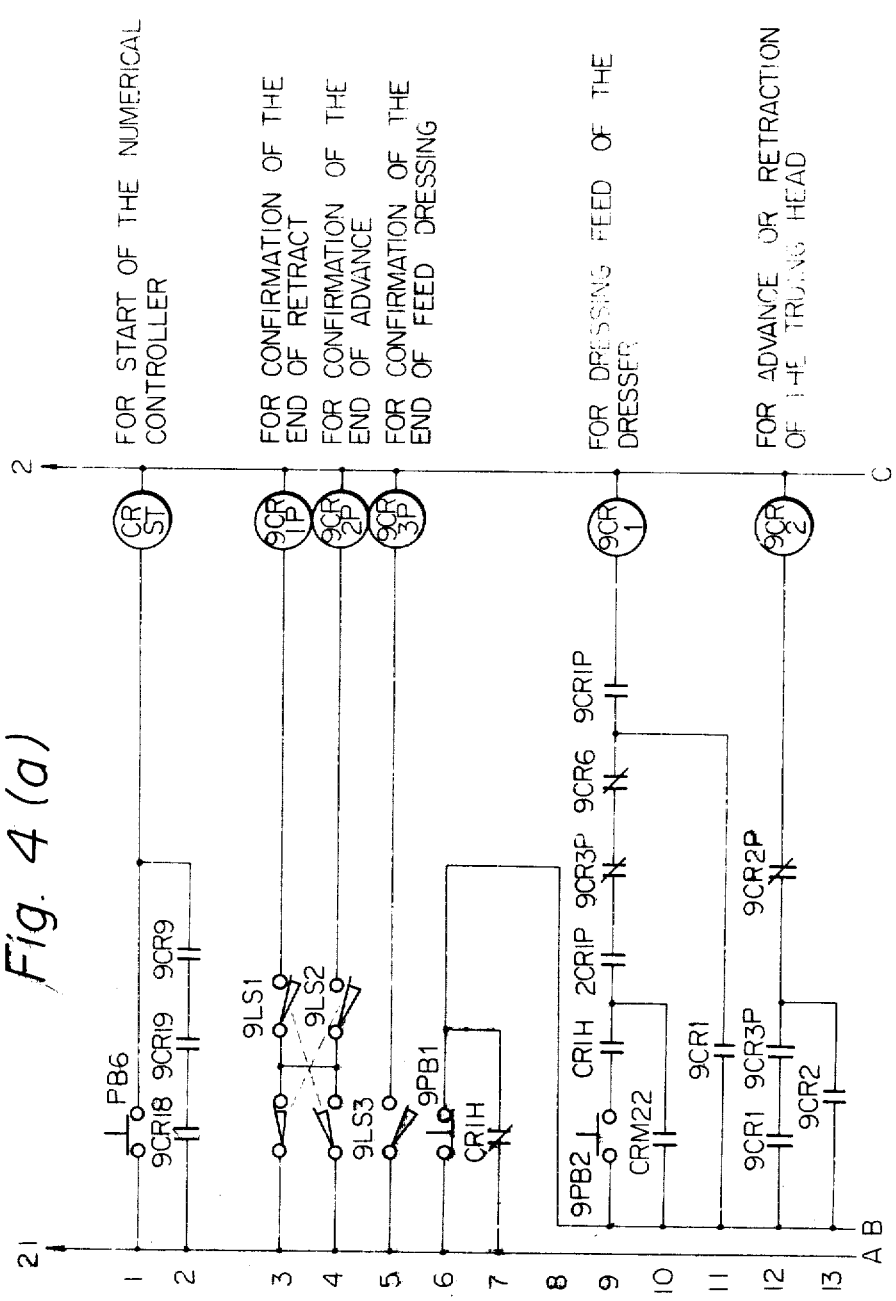

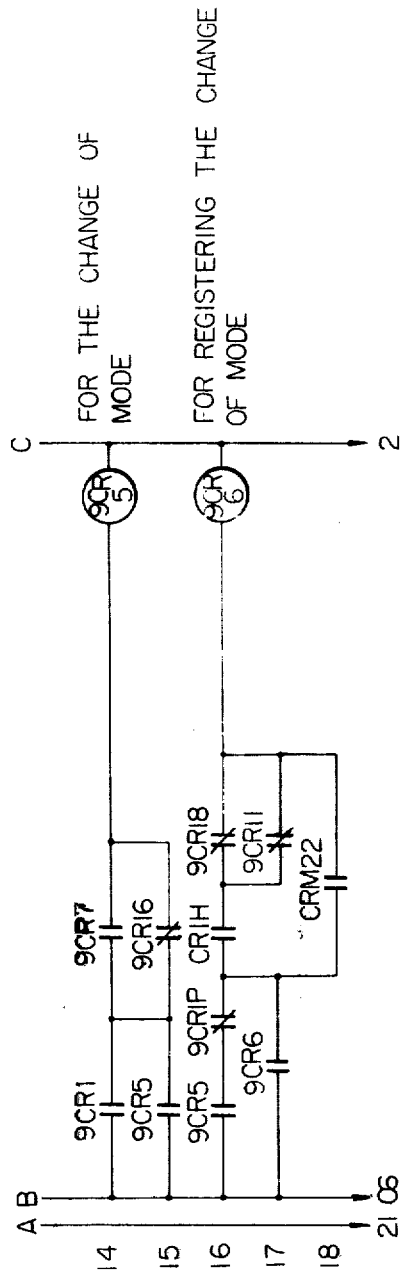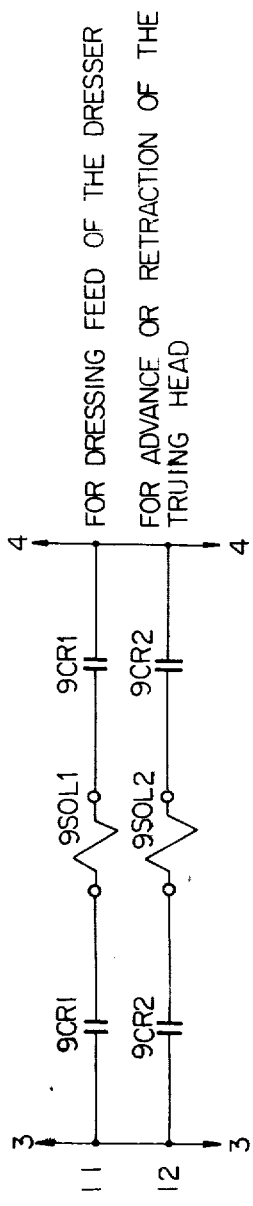

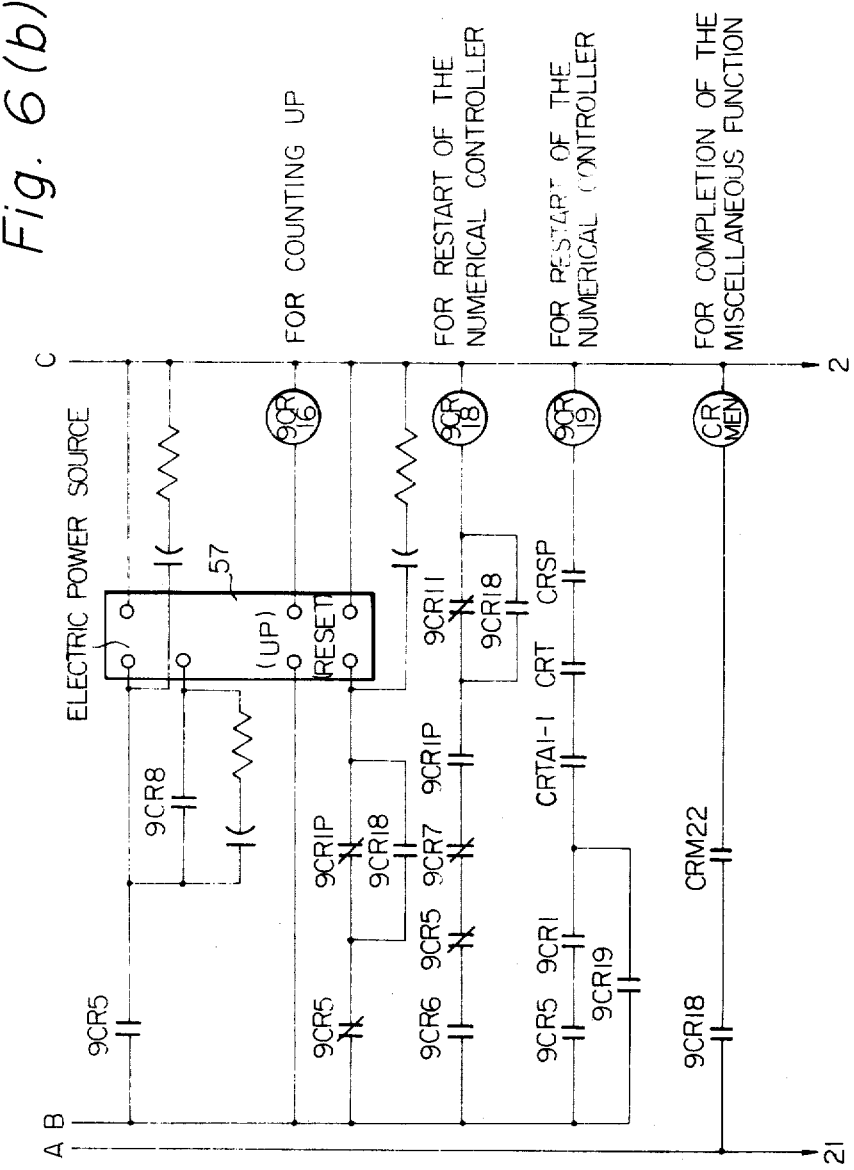

NUMERICALLY CONTROLLED MACHINE TOOL

DESCRIPTION OF THE INVENTION

The present invention relates to a numerically controlled machine tool and more particularly, relates to an improved numerically controlled machine tool in which part of feeding motions of a movable member of the machine tool can be easily varied. The machine tool is numerically controlled in accordance with, for example, preliminarily programmed tape commands, by the operation of a setting means during the numerical controlling of the machine tool.

In a conventional numerically controlled machine tool, the motion of a movable part of the machine tool is controlled by a numerical controller on the basis of data preliminarily programmed in, for example, a command tape. Thus, the feeding motion of the movable part of the machine tool is always determined by the programs of the command tape. In other words, the movable part cannot carry out any feeding motions other than the programmed one. However, in the numerically controlled machine tool, it is often required that part of a series of machining motions can be easily varied by a command from the exterior of the machine tool. For example, in a numerically controlled grinding machine, a position compensation feed for the wheel head for compensating wheel wear due to dressing, is carried out according to the data of the command tape. However, it is often required to vary the amount of dressing feed in response to a required accuracy in the grinding of a workpiece and, as a result, it is also required to vary the amount of position compensation feed for the wheel head. However, the conventional numerical controller cannot function to carry out such variations of the amounts of both feeds and, therefore, reproduction of a command tape is often required.

Also, in machining a number of workpieces along the same production line, sometimes partial variations in the shapes of only some of the workpieces are required. These workpieces can be referred to as "resembling products." When the resembling products are produced by the conventional numerically controlled machine, individual command tapes must have previously been produced for each partial variation in shape and, as a result, a considerable amount of time must be spent to produce individual command tapes.

Therefore, it is an object of the present invention to provide a numerically controlled machine tool which can provide not only partial variations to a series of feeding motions of a movable member of the machine tool, which are numerically controlled in accordance with prefixed data in for example, a command tape, by the operation of a setting means in which the partial variations to the feeding motions can easily be set from the exterior during the numerical control operation, but also, automatically carry out and control the partial variations of the feeding motions during a continuing sequence of the feeding motions.

DESCRIPTION OF THE PREFERRED EMBODIMENT

The present invention will be more apparent from the ensuing descriptions of a preferred embodiment with reference to the accompanying drawings wherein:

FIGS. 4 through 7 are electrical circuit diagrams with respect to the dressing control of the subordinate control device of FIG. 1, in which FIG. 7 shows a connection between the subordinate control device and the numerical controller.

Figure 1:
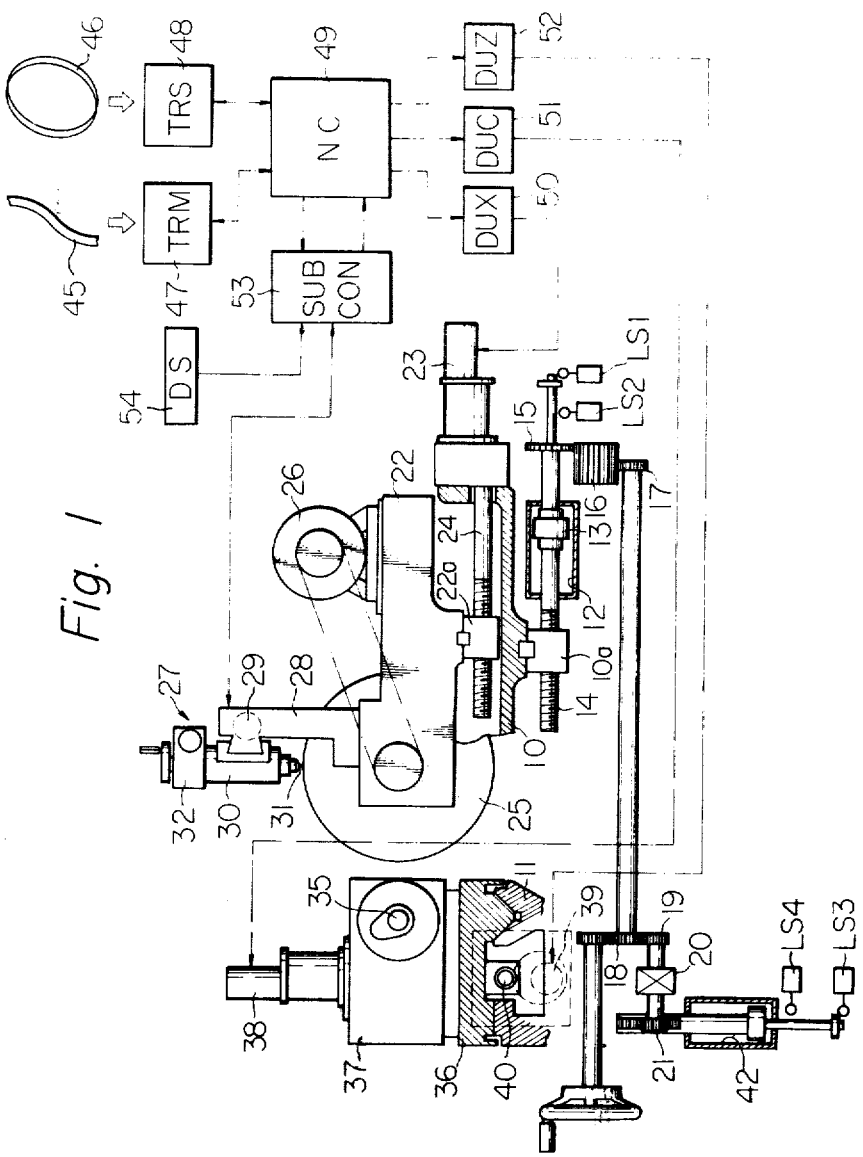
FIG. 1 is a schematic view of a feeding mechanism and a control system of an embodiment of a numerically controlled machine tool according to the present invention.

In FIG. 1 which schematically shows a partial view of a feed mechanism and a control system of a numerically controlled cam grinding machine, an intermediate base 10 is movably mounted on guide ways (not shown) of a stationary bed 11. This intermediate base 10 is provided with a feed nut 10a which is engaged with a feed screw 14 formed as one part of a piston 13 of a rapid feed cylinder 12. The piston 13 together with the feed screw 14 can be rotated by a grinding feed cylinder 42 through a rack-pinion mechanism 21, a clutch 20, and gears 19, 18, 17, 16 and 15. Thus, the intermediate base 10 and the wheel head 22 obtain their feeding motions and their rapid feeding motions respectively, from the grinding feed cylinders 42 and the rapid feed cylinder 12. The wheel head 22 slidably mounted on the intermediate base 10 can be moved by an X-axis stepping motor 23 fixedly mounted on the intermediate base 10, through the engagement of a ball nut 22a with a screw 24. The wheel head 22 is provided with a grinding wheel 25, which is rotated by means of a motor 26, and a wheel dressing device 27 for truing the grinding wheel 25. This dressing device 27 is provided with a body 28 supporting a truing head 30 which is capable of traversing in a direction parallel to the axis of the grinding wheel 25 when operated by a cylinder 29. A dresser 31 of the truing head 30 is provided so that it advances and enters into the grinding wheel 25 from the direction perpendicular to the grinding face of the grinding wheel 25 when operated by an intermittent infeed device 32. A workpiece, such as a camshaft 35, is supported at its opposite centers by a head stock 37 mounted on a work table 36 and a tail stock (not shown). The workpiece 35 can be rotated by a C-axis stepping motor 38 mounted on the head stock 37. The work table 36 is slidably mounted on guide ways formed on the bed 11 and is traversed by means of a screw shaft 40 associated with a Z-axis stepping motor 39 in the direction parallel to the axis grinding wheel 25.

Figure 2:
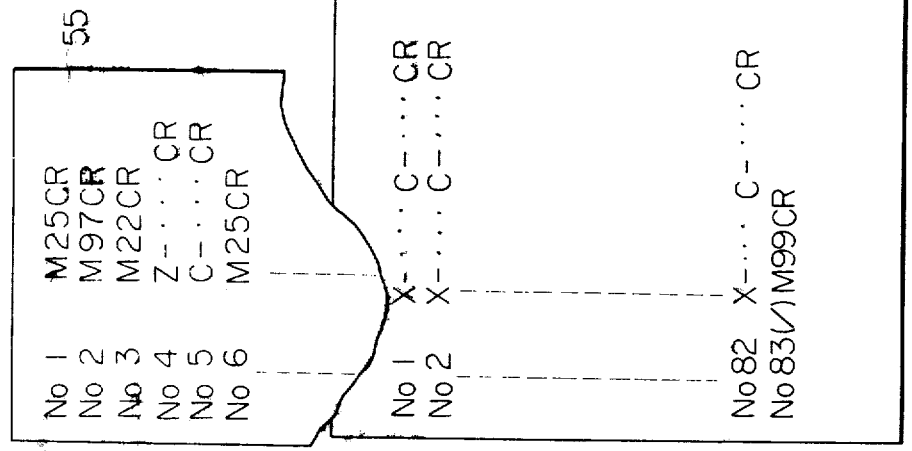
FIG. 2 is a partial view of a sequence tape and a profile tape showing programmed data therein.

In FIG. 1 numeral 45 represents a sequence tape in which command data for grinding feed motions of the grinding wheel 25 and for dressing the grinding wheel 25 are programmed, and numeral 46 designates a profile tape in which data for a cam generation motion, due to the simultaneously two axes control of X-axis and C-axis, are programmed. The data of these two tapes 45 and 46 are read by a main tape reader 47 and a sub tape reader 48 and are subsequently supplied to a numerical controller 49. The numerical controller 49 drives and controls respective stepping motors 23, 38 and 39 through corresponding drive units 50, 51, and 52. A subordinate control device 53 controls feed cylinders 12 and 42 so as to provide feeding motions for the wheel head 22 through the motion of the intermediate base 10. The subordinate control device 53 also operates the dressing device 27. An example of these motions of the wheel head 22 and the dressing device 27 will be explained hereinafter on the basis of the data of program sheets 55 and 56 of FIG. 2. In the example, it should be noted that the program sheets 55 and 56 correspond to the previous program tapes 45 and 46.

Figure 3:
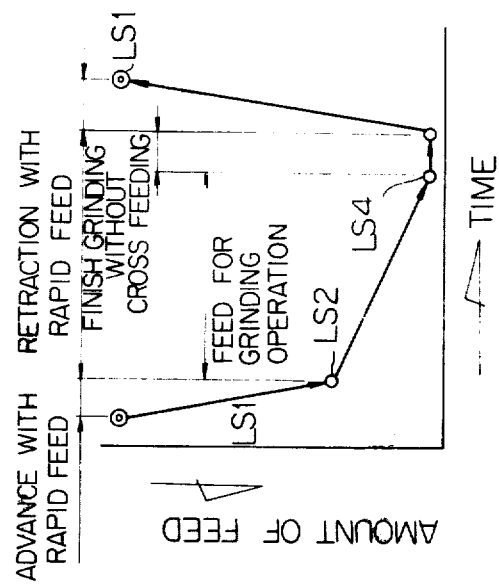
FIG. 3 is a diagram indicating a feeding cycle of a wheel head.

When a start command is given to the numerical controller 49, a command M25 (CR designates the block end of a command) of the sequence tape 45 is read by the reader 47 and then, the command M25 is supplied from the reader 47 to the numerical controller 49 and the subordinate control device 53. Thus, the subordinate control device 53 operates the rapid feed cylinder 12 in order to rapidly advance the intermediate base 10, so that the wheel head 22 is controlled in a sequence as shown by the cycle diagram of FIG. 3. When it is confirmed by a limit switch LS2 that the intermediate base 10 has come to the end of its rapid advancement, the grinding feed cylinder 42 is operated in order to provide a grinding feed motion for the intermediate base 10. Also, when the intermediate base 10 is moved away from a limit switch LS1 and the limit switch LS1 is de-energized, the miscellaneous function of the command M25 is completed. Therefore, a command M97 of the second block of the tape 45 is subsequently read by the tape reader 47. This command M97 read by the reader 47, operates the sub tape reader 48. Consequently, both X-axis and C-axis stepping motors 23 and 38 are simultaneously controlled in accordance with data of the profile tape 46. Thus, the wheel head 22 is provided with a cam generation motion synchronized with the rotational angle of the cam shaft 35, in addition to the abovementioned grinding feed motion, so that grinding of a first cam of the cam shaft 35 is attained. During generation of the first cam of the cam shaft 35, the data of the tape 46 are repeatedly read, and the intermediate base 10 maintains its advancement until the cylinder 42 operates a limit switch LS4. When the limit switch LS4 is operated, a finish grinding without crossfeeding is carried out for a while and then, the wheel head 22 is retracted to its initial position by the reversed operation of the cylinders 12 and 42. When the wheel head 22 is fully retracted, a limit switch LS1 is operated, so that a conditional command (/) M99 of the final block of the profile tape 46 becomes effective. This command M99 is a jump command to the main tape reader 47. Thus, a command M22 of the sequence tape 46 is subsequently read and, according to the command M22, dressing of the grinding wheel 25 is carried out. Then, according to the subsequent command Z-... of the tape 45, the Z-axis stepping motor 39 is driven so that the table is indexed to the position where a second cam of the cam shaft 35 faces the grinding wheel 25. Subsequently, according to a command C-..., the angular position of the second cam about its central axis is adjusted to the position of the grinding wheel 25 so that grinding of the second cam can be effected.

Figure 6A:
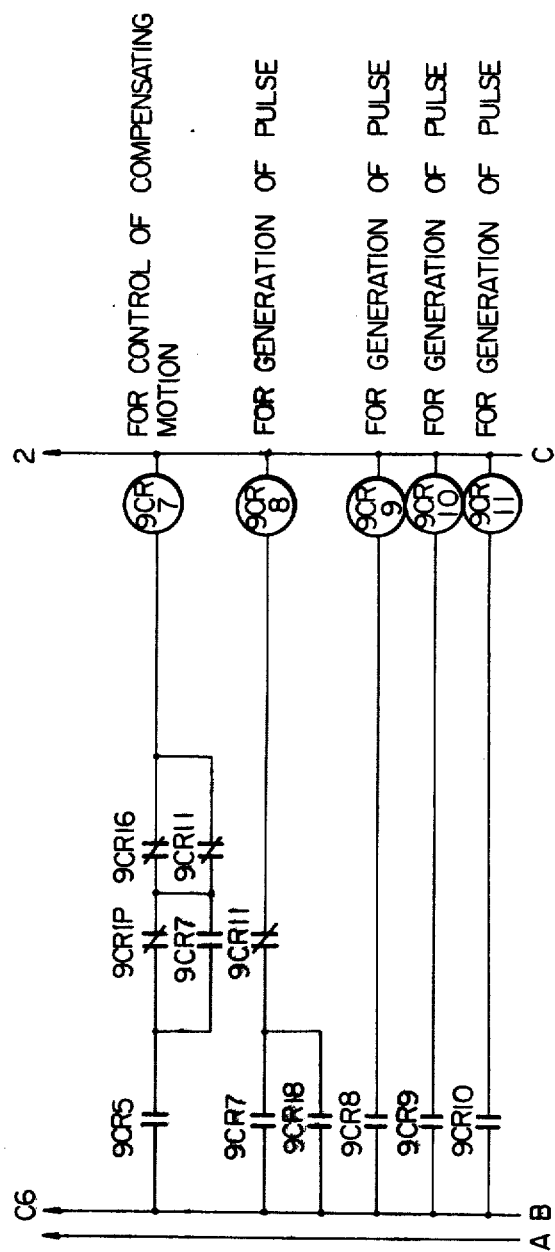
Figure 7:
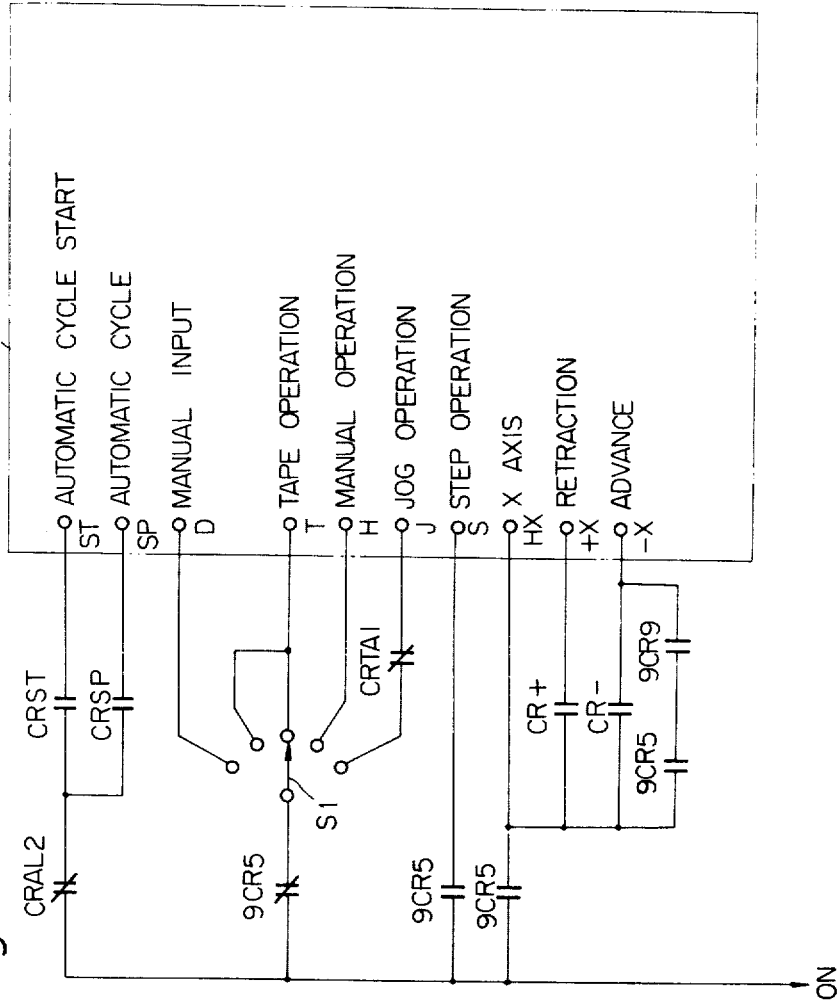

In the present embodiment of the present invention, it should be noted that according to the miscellaneous function command M22, incorporated in a series of numerical control data, dressing of the grinding wheel 25 is also carried out. Moreover, for this dressing of the grinding wheel 25, a position compensation feed of the wheel head 22 is accomplished by the X-axis stepping motor 23 by an amount set by a digital switch 54. This fact will hereinafter be explained in detail, with reference to FIGS. 4 through 7. A relay CRST arranged in the uppermost line of the circuit of FIG. 4 is energized by a start push button switch PB6, and a contact CRST of this relay CRST, shown in FIG. 7, is closed so that a start signal for the automatic cycle is imparted to the numerical controller 49. As a result, the aforementioned grinding operation of the workpiece 35 is started.

Relays 9CR1P and 9CR2P arranged in the third and the fourth lines of the circuit of FIG. 4, are energized by the depressions of limit switches 9LS1 and 9LS2 (not shown in FIG. 1) for confirmation of the ending of advance and retraction of the truing head 30 in the direction parallel to the axis of the grinding wheel 25. A relay 9CR3P connected with a limit switch 9LS3 confirms the end of infeeding advance of the intermittent infeed device 32. A push button switch 9PB1 is provided for retraction of the truing head 30, and a push button switch 9PB2 is provided for infeeding of the dresser 31. A normally closed contact CR1H and a normally opened contact CR1H are opened and closed, respectively, when a mode changing switch S1 of FIG. 7 is brought into the jog mode. A miscellaneous function command contact CRM22 is arranged parallel to the push button switch 9PB2 and the normally opened contact CR1H. Therefore, a relay 9CR1 for infeeding of the dresser 31 is placed in the energized state through the contact CRM22, a relay contact 2CR1P for confirmation of the retracting end of the wheel head 22, normally closed contacts 9CR3P, 9CR6 and a contact 9CR1P when the aforementioned miscellaneous function command M22 is supplied during the automatic operation in which the mode changing switch S1 is held in a tape mode. As a result, a solenoid 9SOL1 of FIG. 5 is energized to provide a suitable amount of infeed for the dresser 31. Subsequently, a relay 9CR2 for advancing and retracting the truing head 30 is placed in the energized state through contacts 9CR1 and 9CR3P, and a normally closed contact 9CR2P. At the same time, a relay 9CR5 for the change of mode is also placed in the energized state through the contact 9CR1 and a normally closed contact 9CR16. Thus, a solenoid 9SOL2 of FIG. 5 is energized on the one hand and, on the other hand, a relay 9CR6 for registering the change of mode is placed in the energized state through a contact 9CR5, a normally closed contact 9CR1P and a contact CRM22. Also, a relay 9CR7 for control of compensating motion, shown in FIG. 6, is placed in the energized state through the contact 9CR5, the normally closed contacts 9CR1P, and 9CR16. As a result, the truing head 30 traverses in its advancing direction by the energization of the solenoid 9SOL2, so that dressing of the grinding wheel 25 is started. As soon as the dressing of the grinding wheel 25 is started, the relay 9CR1P is de-energized, thereby opening the contact 9CR1P. As a result, the relay 9CR1 is de-energized and is held in the de-energized state, since the normally closed contact 9CR6 has already been brought into the opened state.

The aforementioned energization of the relay 9CR5 causes opening of a normally closed contact 9CR5 of FIG. 7, as well as closing of normally opened contacts 9CR5 shown in FIG. 7, so that the operation mode of the numerical controller 49 is changed from automatic operation to step operation and also, the circuits connected to the terminals HX and -X of the numerical controller 49 are ready for working.

Also, the above-mentioned energization of the relay 9CR7 causes energizations, in turn of relays 9CR8, 9CR9, 9CR10 and 9CR11 constituting pulse generation circuits. When the relay 9CR11 is energized and the normally closed contact 9CR11 is opened, the relay 9CR8 is de-energized and thus, the relays 9CR9, 9CR10 and 9CR11 are also de-energized in turn. Therefore, the energizations and the de-energizations of the relays 9CR8, 9CR9, 9CR10 and 9CR11 are alternately repeated during the energized state of the relay 9CR7, as can be understood from FIG. 6. It should be noted that when the relays 9CR8, 9CR9, 9CR10 and 9CR11 are energized in turn and a counting pulse is imparted to a counter 57 through contacts 9CR5 and 9CR8, and a drive pulse is imparted to the numerical controller 49 through the contacts 9CR5 and 9CR9 of FIG. 7. Thus, the numerical controller 49 produces each step of the X-axis stepping motor 23 through the drive unit 50 each time the relays 9CR8 through 9CR11 are energized and, as a result, the position of the wheel head 22 is adjusted to compensate for the wear of the grinding wheel 25 due to the dressing.

The relay 9CR2 for advance or retraction of the truing head 30 is de-energized by the opening of the normally closed contact 9CR2P when the truing head 30 comes to the end of its traverse in the advancing direction. As a result, the solenoid 9SOL2 is de-energized so that the truing head 30 is traversed in the retracting direction. In the counter 57, the position compensation amount for the wheel head 22 is preset by the aforementioned digital switch 54 (FIG. 1). Therefore, when the number of pulses generated due to the closing of the contacts 9CR8 reaches the above-mentioned position compensation amount preset in the counter 57, a relay 9CR16 for counting is energized.

Consequently, the relay 9CR7 is de-energized by the opening of the normally closed contact 9CR16 and by the subsequent opening of the normally closed contact 9CR11, so that the aforementioned repetition of energization and de-energization of the relays 9CR8 through 9CR11 for generation of pulses is finished. Subsequently, the relay 9CR5 is de-energized by the opening of both normally closed contact 9CR16 and normally opened contact 9CR7. As a result, in the circuit of FIG. 7, the normally opened contacts 9CR5 as well as the normally closed contact 9CR5 are restored to their normal positions, so that the numerical controller 49 is restored from the step mode to the automatic mode and also, simultaneously, in the circuit of FIG. 6, the counter 57 is reset by restoration of the normally closed contacts 9CR5 and 9CR1P. When the truing head 30 goes to the end of its retraction, the relay 9CR18 for restart of the numerical controller is placed in the energized state through the normally closed contacts 9CR5 and 9CR7, the normally opened contact 9CR1P and the normally closed contact 9CR11 in the circuit of FIG. 6. As a result, a relay CRMEN for completion of the miscellaneous function is energized through contacts 9CR18 and CRM22 so that a signal indicating completion of the miscellaneous function is supplied to the numerical controller 49. At this time, the relay 9CR8 is again energized and accordingly, the relays 9CR9 through 9CR11, for generation of pulse, are energized in turn. Further, another relay 9CR19 for restart of the numerical controller 49 is energized through contact 9CR5, 9CR1, and contacts CRTAL-1, CRT and CRSP for preparation of tape operation, when the relay 9CR5 for the change of mode is energized, and the energization of the relay 9CR19 is held by a contact 9CR19. Therefore, the start relay CRST of FIG. 4 is energized through the contacts 9CR18, 9CR19 and 9CR9 so that the numerical controller 49 is again automatically operated. As a result, the numerical controller 49 now carries out a subsequent command data Z-... coming next to the miscellaneous function command M22. Consequently, the miscellaneous function command M22 is released, and the contact CRM22 is opened so as to de-energize the relay 9CR6 and CRMEN. Further, the relay 9CR18 is de-energized by the opening of the contact 9CR6.

From the foregoing it will be understood that in a numerically controlled machine tool according to the present invention, when a special command M22 out of a series of programmed command data is provided for a numerical controller 49, the operational mode of the controller is varied from the automatic operation to the step operation, and also a pulse generating circuit provided in the control system of the numerically controlled machine tool is operated so that the output pulses of the circuit are imparted to the controller 49. As a result, part of the feeding motions of a movable member, such as the wheel head 22 of the machine tool, are controlled by the cooperation of the controller and the pulse generating circuit. Further, part of the feeding motions of the movable member 22 can be effectuated on the basis of a command from a setting device, such as the digital switch 54, in which the command can easily and adjustably be set. Therefore, even in the case where resembling products must be machined or where it is required to vary the dressing amount for the grinding wheel, reproduction of a command tape or card is not necessary at all. As a result, the preparation for machining can be considerably simplified and, therefore, the operating efficiency is very much increased in a numerically controlled machine tool according to the present invention. Further, the scope of practical application of the numerical control technique for machine tools is very much extended.

What is claimed is:

1. A numerically controlled machine tool having a grinding wheel head, a grinding wheel, a truing head and a numerical controller for controlling feeding motions of movable members of the machine tool in response to command data including command programmed on a command tape, comprising;

reading means for reading said series of command data from said tape;

relay circuit means for effecting change of mode of the numerical controller from an automatic operation to a step operation for the dressing of said grinding wheel in response to the reading of said dressing command by said reading means;

setting means operable upon the change of mode of said numerical controller from automatic to step operation for setting a desired dressing feed amount;

a feed device responsive to said setting means for feeding said truing head toward said grinding wheel in the desired dressing feed amount in order to dress said grinding wheel;

a pulse generating circuit for supplying said numerical controller with a drive pulse train responsive to said desired dressing feed amount;

a pulse motor for moving said wheel head toward and away from a workpiece;

a control circuit for controlling said pulse motor in response to said drive pulse train in order to compensate for the position of said wheel head, and for producing a signal indicative of completion of the compensating operation of said wheel head, and;

a mode restoration circuit for stopping the pulse generation of said pulse generating circuit in response to the completion signal of said control circuit and for restoring said numerical controller to automatic operation so as to operate in response to said series of command data.

2. A numerically controlled machine tool as set forth in claim 1, wherein said relay circuit means for effecting change of mode comprise sequentially operated relay circuits having at least a normally opened contact (CRM22) which is closed for the start of the operation of the relay circuits when said dressing is applied to the numerical controller, and a relay (9CR5) which operates to close its normally open contact (9CR5) for effecting the change of mode of said numerical controller to the step operation.

3. A numerically controlled machine tool as set forth in claim 1, wherein said setting means comprises a digital switch for digitally setting said command, and a pulse counter for presetting said digital command.

4. A numerically controlled machine tool as set forth in claim 3, wherein when the number of drive pulses from the pulse generating circuit reaches the number of said digital command of the pulse counter, said control circuit issues the signal indicative of completion of the compensating operation.

5. A numerically controlled machine tool as set forth in claim 1, wherein said pulse generating circuit comprises relays arranged in parallel with each other so as to cyclically repeat their alternate energizations and de-energizations during the step operation of said numerical controller whereby each drive pulse is generated each time said relays are energized.

* * * * *

UNITED STATES PATENT AND TRADEMARK OFFICE
CERTIFICATE OF CORRECTION

PATENT NO. : 3,895,279
DATED : July 15, 1975
INVENTOR(S) : Suzuki, Isao et al

It is certified that error appears in the above—identified patent and that said Letters Patent are hereby corrected as shown below:

Col. 6, line 48: After "including" insert --a dressing--.

Signed and Sealed this twenty-fifth Day of November 1975

[SEAL]

Attest:

RUTH C. MASON
Attesting Officer

C. MARSHALL DANN
Commissioner of Patents and Trademarks